US009399977B2

(12) United States Patent
Woelfl et al.

(10) Patent No.: US 9,399,977 B2
(45) Date of Patent: Jul. 26, 2016

(54) DEVICE AND METHOD FOR STARTING AN INTERNAL COMBUSTION ENGINE ARRANGED IN A VEHICLE

(71) Applicant: Bayerische Motoren Werke Aktiengesellschaft, Munich (DE)

(72) Inventors: Gerhard Woelfl, Geltendorf (DE); Daniel Findeisen, Erding (DE); Michael Daurer, Pliening/Gelting (DE); Hartmut Proebstle, Wuerzburg (DE); Sherif Mahmoud, Munich (DE); Rupert Neudecker, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 359 days.

(21) Appl. No.: 14/058,540

(22) Filed: Oct. 21, 2013

(65) Prior Publication Data
US 2014/0048031 A1 Feb. 20, 2014

Related U.S. Application Data

(63) Continuation of application No. PCT/EP2012/057012, filed on Apr. 17, 2012.

(30) Foreign Application Priority Data

Apr. 21, 2011 (DE) .......................... 10 2011 007 874

(51) Int. Cl.
*F02N 11/00* (2006.01)
*H02P 7/29* (2016.01)
(Continued)

(52) U.S. Cl.
CPC .............. *F02N 11/00* (2013.01); *F02N 11/087* (2013.01); *H02P 7/29* (2013.01); *F02N 11/0866* (2013.01); *F02N 11/10* (2013.01); *F02N 2011/0888* (2013.01)

(58) Field of Classification Search
CPC ... F02N 11/00; F02N 11/0866; F02N 11/087; F02N 11/10; F02N 2011/0888; F02N 2011/0874; F02N 2011/0877; F02N 2011/0881; F02N 2011/0885; F02N 2011/0892; F02N 2011/0896; H02P 7/29

USPC ......... 123/179.28, 179.29, 179.3, 179.4, 366; 701/22, 101, 113; 180/65.285, 65.31, 180/65.8; 318/811, 803, 813; 290/31
See application file for complete search history.

(56) References Cited

U.S. PATENT DOCUMENTS

| 3,750,002 | A | * | 7/1973 | Gerhard | ................. | B60L 7/003 |
| | | | | | | 318/139 |
| 5,552,681 | A | * | 9/1996 | Suzuki | ................... | B60K 6/485 |
| | | | | | | 307/66 |

(Continued)

FOREIGN PATENT DOCUMENTS

| DE | 10 2005 002 359 B4 | 12/2009 |
| DE | 10 2008 054 706 A1 | 6/2010 |

(Continued)

OTHER PUBLICATIONS

151216 FR2925618A1 English machine translation.*

(Continued)

*Primary Examiner* — Stephen K Cronin
*Assistant Examiner* — Carl Staubach
(74) *Attorney, Agent, or Firm* — Crowell & Moring LLP

(57) ABSTRACT

A system and method are provided for starting an internal-combustion engine arranged in a vehicle equipped with an electric machine that at least temporarily drives the internal-combustion engine and a first electrical energy storage unit. An adjusting unit is provided by which the electric machine is connectable with the first storage unit. The adjusting unit is configured to detect at least one defined internal-combustion engine operating state and/or at least one defined vehicle operating state and, at least as a function of the detected internal-combustion engine operating state and/or the detected vehicle operating state, for adjusting an electric quantity which determines an electric power drawn from the first storage unit by the electric machine when driving the internal-combustion engine, or for itself adjusting the drawn electric power.

12 Claims, 7 Drawing Sheets

(51) Int. Cl.
*F02N 11/08* (2006.01)
*F02N 11/10* (2006.01)

(56) References Cited

U.S. PATENT DOCUMENTS

| | | | | |
|---|---|---|---|---|
| 5,562,566 A * | 10/1996 | Yang | ................ | B60K 6/365 180/65.25 |
| 6,002,219 A * | 12/1999 | Permuy | ................ | F02N 11/04 180/287 |
| 6,278,194 B1 * | 8/2001 | Nakagawa | ............ | F02N 11/04 290/31 |
| 6,420,793 B1 * | 7/2002 | Gale | ................ | F02N 11/04 123/179.28 |
| 6,919,648 B2 * | 7/2005 | Bolz | ................ | F02N 11/04 290/40 C |
| 6,995,480 B2 * | 2/2006 | Amano | ............ | F02N 11/0866 180/65.23 |
| 7,391,180 B2 * | 6/2008 | Armiroli | ............ | B60K 6/485 180/65.1 |
| 2001/0042649 A1 * | 11/2001 | Maeda | ................ | B60K 6/26 180/65.225 |
| 2005/0099155 A1 * | 5/2005 | Okuda | ............ | F02N 11/0866 320/107 |
| 2006/0108954 A1 * | 5/2006 | Sebille | ................ | F02N 11/04 318/108 |
| 2006/0164776 A1 | 7/2006 | Erdl | | |
| 2007/0200531 A1 * | 8/2007 | Armiroli | ............ | B60K 6/485 318/811 |
| 2007/0240662 A1 * | 10/2007 | Kitamura | ............ | F02D 29/06 123/179.4 |
| 2008/0012538 A1 * | 1/2008 | Stewart | ................ | H02P 9/48 322/89 |
| 2009/0243443 A1 * | 10/2009 | Aoki | ................ | H02K 11/048 310/68 |
| 2010/0072958 A1 * | 3/2010 | Wada | ................ | B60K 1/00 322/22 |
| 2012/0158274 A1 | 6/2012 | Ge et al. | | |
| 2012/0193913 A1 * | 8/2012 | Schweiggart | ............ | F02N 11/04 290/31 |
| 2012/0299543 A1 * | 11/2012 | Januschevski | ...... | B60L 11/1811 320/109 |
| 2013/0187585 A1 * | 7/2013 | Niemann | ................ | B60L 3/003 318/400.21 |
| 2013/0200846 A1 * | 8/2013 | Ang | ................ | B60L 11/1816 320/109 |
| 2013/0221921 A1 * | 8/2013 | Ang | ................ | B60L 11/1811 320/109 |
| 2015/0321578 A1 * | 11/2015 | Gorka | ................ | B60L 11/1868 318/139 |

FOREIGN PATENT DOCUMENTS

| | | |
|---|---|---|
| DE | 10 2009 027 234 A1 | 12/2010 |
| DE | 10 2009 027 931 A1 | 1/2011 |
| FR | 2 855 677 A1 | 12/2004 |
| FR | 2 925 618 A1 | 6/2009 |

OTHER PUBLICATIONS

German Search Report with partial English translation thereof dated Dec. 22, 2011 {Ten (10) pages}.

International Search Report with English translation thereof dated Mar. 4, 2013 {Five (5) pages}.

Chinese Office Action issued in counterpart Chinese Application No. 201280019631.7 dated May 3, 2016, with partial English translation (seven (7) pages).

\* cited by examiner

DEVICE AND METHOD FOR STARTING AN INTERNAL COMBUSTION ENGINE ARRANGED IN A VEHICLE

CROSS REFERENCE TO RELATED APPLICATIONS

This application is a continuation of PCT International Application No. PCT/EP2012/057012, filed Apr. 17, 2012, which claims priority under 35 U.S.C. §119 from German Patent Application No. DE 10 2011 007 874.6, filed Apr. 21, 2011, the entire disclosures of which are expressly incorporated by reference herein.

BACKGROUND AND SUMMARY OF THE INVENTION

The invention relates to a system and a method for starting an internal-combustion engine arranged in a vehicle. The following is provided for starting the internal-combustion engine: an electric machine designed for at least temporarily driving the internal-combustion engine, and a first storage unit designed for storing electric energy.

Internal-combustion engines of different constructions are currently used in automobile manufacturing. One characteristic in which the internal-combustion engines differ with respect to their construction is the type of the ignition initiation. There are self-igniting internal-combustion engines (diesel engines) and externally supplied ignition internal-combustion engines, the most wide-spread externally supplied ignition internal-combustion engine being the Otto engine. A further differentiating characteristic is the number of cylinders. In automobile manufacturing, internal-combustion engines are predominantly used which have three, four, six, eight or twelve cylinders.

So far, an individual starter engine and a pertaining individual energy supply have been developed or conceived for any type of internal-combustion engine: both components were individually designed as a function of the type of ignition initiation and of the number of cylinders. The reasons are the following: the different types of internal-combustion engines each make different demands on the ideal electric power which is consumed by the starter motor during the starting operation and/or the ideal electric current which flows through the starter motor during the starting operation. In addition, the ideal power and the ideal electric current vary for the respective type of internal-combustion engine as a function of the operating temperature of the internal-combustion engine. In the case of a cold start, the starter motor consumes a different electric power than in the case of a warm start.

A further aspect is the following. In the case of vehicles equipped with a so-called automatic start-stop system, as well as in the case of hybrid vehicles, a starting behavior is required which is modified compared with a conventional vehicle. With an automatic start-stop system, the internal-combustion engine is switched off when the vehicle is stopped. In the case of a hybrid vehicle, an internal-combustion engine as well as an electric machine are provided for the propulsion. The modified starting behavior is connected with new operating strategies which are contemplated or become necessary by means of these novel vehicles, and which lead to changed demands on the electric power consumed by the starter motor during the starting operation and on comfort during the starting operation.

In the case of a conventional vehicle, the starter motor and the pertaining energy supply are designed for the first start, or initial start, of the internal-combustion engine, which is first triggered after the driver enters the vehicle at the beginning of a trip. In the case of a first start, it is not necessary for the internal-combustion engine to provide a defined high torque within a very short time.

In the case of a vehicle with an automatic start-stop system, in addition to the first start, a restart and possibly an additional start of the internal combustion engine also have to be carried out. In the case of a restart as well as an additional start, there is at first no operative connection between the internal-combustion engine and the driven wheels of the vehicle, but it is immediately imminent. The restart and the additional start are caused by a control unit installed in the vehicle. A restart to be carried out is recognized when a start driving signal is present in an idle vehicle state (in the idle vehicle state, the vehicle has stopped and the internal-combustion engine has stopped or has a rotational engine speed between a rotational switch-off speed and the zero value). An additional start to be carried out is recognized when, in a moving state of the vehicle, an engine torque demand is present (in the moving state, the vehicle is driven and the internal-combustion engine has stopped or has a rotational engine speed between a rotational switch-off speed and the zero value).

In the case of the idle vehicle state as well as the moving vehicle state, it is the intention that the internal-combustion engine is either idle (rotational engine speed of zero) or is carrying out a diminishing rotational engine movement (rotational engine speed between the rotational switch-off speed and the zero value). In the idling vehicle state, the vehicle speed preferably should have a zero value. However, automatic start-stop systems are also contemplated, in the case of which a restart can be carried out when the vehicle is moving at a speed that is not too high, for example at 3 km/h or at 20 km/h. A restart to be carried out can therefore also be recognized when, in a conditional vehicle moving state, a start driving signal is present, in which case the conditional vehicle moving state will be present when the speed of the vehicle is lower than a threshold value which amounts to, for example, 3 km/h or 20 km/h.

In the moving state of the vehicle, the vehicle speed has an arbitrary value different from zero, which is preferably clearly higher than 20 km/h and, for example, at 50 km/h or 70 km/h or clearly higher values. The start driving signal represents an immediately imminent driving start of the vehicle which is to begin from the idle vehicle start. This should preferably be a driving start initiated by the driver. In this case, the start driving signal may, for example, be a signal that represents the actuation of the clutch pedal by the driver. However, as an alternative, the driving start may also be automated, thus initiated independently of the driver. The engine torque demand represents a torque which is to be adjusted by the internal-combustion engine in the present vehicle moving state in a driver-dependent or driver-independent manner. A torque to be adjusted in a driver-dependent manner occurs, for example, as a result of an actuation of the accelerator pedal by the driver. Here, the torque demand may therefore be a magnitude representing the accelerator pedal actuation. For example, a longitudinal control unit can generate a driver-independent engine torque demand, in which case, the longitudinal control system may, for example, be an adaptive cruise control. The switch-off rotational speed is that rotational engine speed of the internal-combustion engine which occurs when the internal-combustion engine is disconnected, i.e. during or immediately after the interruption of the operative connection with the driven wheels, for example, caused by actuating the clutch. In the first moment, the rotational switch-off speed can correspond to the rotational idling speed but, depending on the operation, may also temporarily be above the rotational idling speed.

The restart and the additional start of the internal-combustion engine differ from an initial start. During the restart, for example, at a traffic light, a large torque has to be provided by the internal-combustion engine within a very short time; the internal-combustion engine is started more rapidly than during the initial start. During the additional start of the internal-combustion engine in a moving state of the vehicle, the internal-combustion engine has to provide a torque correlating with the vehicle moving state within a very short time; a very fast "pulling-up" of the internal-combustion engine to a desired rotational driving speed is required (reflex start).

In the case of a hybrid vehicle, an additional start of the internal-combustion engine has to be carried out together with the first start. The statements made above with respect to a vehicle having an automatic start-stop system also apply here correspondingly.

These new operating strategies (additional start and/or restart) with the resulting modified starting behavior require a starter motor coordinated with the respective internal-combustion engine and a pertaining energy supply which are more efficient with respect to the components used in conventional vehicles. The components used in conventional vehicles therefore cannot simply be used in the novel vehicles.

A further aspect requiring the use of changed and therefore novel starter motors is the following: new drive architectures, as used, for example, in the case of micro- or mild-hybrid vehicles, specify new operating voltages for the starter motor. In the case of these drive concepts, the starter motor is supplied by way of a separate onboard power supply system whose voltage may be in the range of from above 12 V to 60 V, but may also amount to above 300 V. In this case, this voltage is above the voltage of a conventional onboard power supply system, which normally amounts to 12 V.

A further aspect requiring the development of novel starter motors is the use of electric energy storage devices which, in comparison to conventional lead batteries, can supply much higher short-circuit currents. One example are so-called supercapacitors which can provide short-circuit currents in the order of up to 1,500 A.

If the previous approach were used, while taking into account the above-indicated aspects, specifically the type of ignition initiation, the number of cylinders, including the taking-into-account of the operating temperature of the internal-combustion engine, the new operating strategies, the new drive architectures and the new electric energy storage devices, which all each make individual demands on the ideal electric power consumed by a starting motor during the starting operation and/or on the ideal electric current flowing through the starter motor during the starting operation, a large number of individually designed starting motors and pertaining energy supply systems would be required. In the case of a vehicle to which several of these aspects apply, particularly the aspects of new operating strategies, new drive architectures and new energy storage devices, in each case, while taking into account the operating temperature of the internal-combustion engine, this would have the result that such a vehicle would have to be equipped with a plurality of starting systems (starter motor and onboard power supply system) individualized with respect to the respective aspects. One example of a vehicle where this could be the case is a hybrid vehicle.

It is therefore an object of the present invention to further develop a system and a method of the initially mentioned type in order to, in the case of a vehicle, to which several aspects apply which each make individual demands on the ideal electric power drawn by a starter motor during the starting of an internal-combustion engine and/or on the ideal electric current flowing through the starter motor during the starting of an internal-combustion engine, instead of requiring a plurality of individualized starter motors or starter systems, have only a single starter motor or a single starter system. In particular, the use of already available, cost-effective direct-current starter motors should be possible. On the whole, a cost-effective, easily operable system requiring little space and/or a corresponding method are to be provided.

This and other objects are achieved by a system for starting an internal-combustion engine arranged in a vehicle, having an electric machine designed for at least temporarily driving the internal-combustion engine, and a first storage unit designed for storing electric energy. The system has an adjusting unit by which the electric machine can be connected with the first storage unit. The adjusting unit is designed for detecting at least one defined internal-combustion engine operating state and/or at least one defined vehicle operating state and, at least as a function of the detected internal-combustion engine operating state and/or the detected vehicle operating state, for adjusting an electric quantity which determines an electric power drawn from the first storage unit by the electric machine when driving the internal-combustion engine, or for itself adjusting the drawn electric power.

This object is further achieved by a method whereby the following steps take place in an adjusting unit by which the electric machine can be connected with the first storage unit: (i) detecting at least one defined internal-combustion engine operating state and/or at least one defined vehicle operating state, and (ii) adjusting an electric quantity which determines an electric power drawn by the electric machine from the first storage unit for driving the internal-combustion engine, or the drawn electric power itself, at least as a function of the detected internal-combustion engine operating state and/or of the detected vehicle operating state.

The system according to the invention and the method according to the invention are based on the following. With respect to the circuitry, an adjusting unit is inserted between the electric machine and the first storage unit. By way of this adjusting unit, an electric quantity, which determines an electric power drawn from the first storage unit during the driving of the internal-combustion engine, or the drawn power itself, can be adjusted. Thus, in the case of a vehicle to which several aspects apply, which each separately make individual demands on the ideal electric power which is consumed by a starter motor during the starting of an internal-combustion engine, the possibility is provided to directly or indirectly adjust the drawn and thereby consumed electric power, specifically according to the aspect that is valid at the current time or is to be taken into account in each case. The drawn electric power can therefore be adjusted corresponding to the respective aspect and can thereby be adapted to the correspondingly resulting starting demand. It thereby becomes possible, by use of a single starter motor or by use of a single starting system, to meet all demands on the drawn electric power and thus the start of the internal-combustion engine per se, which are defined or predefined by the different aspects to be used or to be taken into account for the respective vehicle.

The adjusting unit permits an adjusting or active varying of the electric power drawn from the first storage unit and thereby consumed by the electric machine or of the electric quantity that determines this power. As a result of the fact that the adjusting of the drawn electric power or of the electric quantity takes place at least as a function of an internal-combustion engine operating state and/or a vehicle operating state, an adaptation becomes possible at least to the different realities during the cold start and warm start as well as to the different realities of the respective new operating strategy. This permits the following approach to the development and conception of the electric machine: it is determined ahead of time in which internal-combustion engine operating state or vehicle operating state, or combination of both types of states, the highest-value electric power is consumed by the electric machine. The electric machine will then be designed for this electric power. The adjusting unit can then adjust the electric power drawn from the first storage unit for those internal-combustion engine operating states or vehicle operating states, or combinations of both types of states, in which the electric power of the highest value does not occur.

The adjusting unit represents a system connected on the input side by which the electric power drawn from the first storage unit and therefore consumed by the electric machine can be adjusted or limited.

In order to permit the above-mentioned adaptation, the adjusting unit preferably has at least one detection unit and a triggering unit. The detection unit is constructed for detecting at least one defined internal-combustion engine operating state and/or at least one defined vehicle operating state. The triggering unit is designed for setting, as a function of the detected internal-combustion engine operating state and/or of the detected vehicle operating state, the drawn electric power or that electric quantity which determines the drawn electric power.

If further pertinent values and/or parameters are detected or at least processed in the adjusting unit, an adaptation becomes possible of the drawn electric power to further aspects or to demands predefined by the latter; thus, for example, to the type of the ignition initiation, to the number of cylinders, to the type of the drive architecture to be used or to the type of the used electric energy storage devices.

Consequently, the adjusting unit is designed for limiting an electric current drawn by the electric machine from the first storage unit. The electric current is therefore the electric quantity to be adjusted, which determines the drawn electric power. In its functionality, the adjusting unit corresponds to an adjustable or controllable impedance. The drawn current can be easily and precisely adjusted, which is therefore correspondingly applicable to the drawn electric power. The electric machine can therefore be designed for the maximally possible electric current flowing through it, in which case, for those internal-combustion engine operating states or vehicle operating states, or combinations of the two types of states, in which this current does not occur, the current flowing through the electric machine is limited to a correspondingly lower value.

The electric machine has a number of stator windings, so that, in a further development of the above-mentioned measure, the adjusting unit is designed for limiting the electric current for the individual stator windings. This measure has the advantage that the electric power drawn by the electric machine or the electric current flowing through it can be adjusted particularly precisely.

In a further development of the invention, the adjusting unit is designed, at least over its partial periphery, for the implementation of a step-down converter functionality. For this purpose, the adjusting unit has, in its periphery relating to the power part, a switching element on the input side, particularly a MOSFET transistor and a recovery diode, in which case, instead of the recovery diode, an additional transistor can be used. Preferably, at least one of the stator windings, of which the electric machine has several, is used as a storage inductivity required for the implementation of the step-down converter. As a result of the combination of the components contained in the adjusting unit—this is either a switching element or a recovery diode or two switching elements—and the stator winding of the electric machine, a modified step-down converter is created which, compared to the classical step-down converter, has no filter capacitor. A step-down converter is a direct-voltage converter of a very simple and robust construction that works very reliably. It is distinguished by the fact that the voltage provided by it on the output side has a lower value than the voltage fed to it on the input side. The value of the voltage provided on the output side is defined by the controlled switching-on and -off of the switching element.

In the case of an electric machine used in a vehicle for propulsion, in the event of a propulsion, very high-value electric currents can flow through this electric machine. For this reason, the inductance required for the implementation of the step-down converter functionality has to be dimensioned to be correspondingly high. The inductance values of a correspondingly suitable inductance are in the order of several $\mu H$, preferably in the range of from 5 to 6 $\mu H$ or even above. Storage inductances with inductance values above 6 $\mu H$ have the advantage that the timing frequency for the operation of the step-down converter can be reduced, whereby the switching losses in the switching elements can be reduced. Such inductances have the disadvantage that they are not only large but also expensive. Here, the inventors now recognized that at least one of the stator windings present in the electric machine anyhow can be used as a storage inductance and, therefore, for the implementation of the step-down functionality. As a result, an independent large and expensive inductance to be provided additionally can be eliminated, which leads to low costs and reduces the space requirement. The electric machine preferably is a pinion starter motor whose armature inductance can be used for implementing the step-down converter functionality. The pinion starter motor is preferably constructed as a permanently excited direct-current motor. It may preferably be an electronically commutated direct-current motor.

By combining the components contained in the adjusting unit with the components of the electric machine, a step-down converter is obtained by which the above-mentioned electric quantity or the drawn electric power itself can be adjusted. In other words, in an interaction with the electric machine, by means of the adjusting unit, the above-mentioned electric quantity or the electric power itself can be adjusted. The modified step-down converter consists of spatially separated components, first components, which are contained in the adjusting unit and (switching elements and/or a recovery diode) and second components which are contained in the electric machine (stator winding).

In a further development of the invention, the adjusting unit is further designed for adjusting the electric quantity or the drawn electric power itself as a function of a value characterizing the internal-combustion engine. The characterizing quantity preferably is a value which characterizes the starting behavior of the internal-combustion engine, particularly the time-related behavior of the internal-combustion engine during the starting operation. This means that, as a function of the starting behavior of the internal-combustion engine, the electric power drawn during the starting operation by the electric machine from the first storage unit or the electric current flowing in this case through the electric machine is adjusted or limited. Advantageously, the adjusting or limiting takes place such that, for the current flowing through the respective stator winding of the electric machine, that current peak that follows the switch-on current peak has such a sufficiently high value that, within the starting operation, the first compression of the internal-combustion engine can take place completely because the internal-combustion engine will otherwise not start. The characterizing quantity is therefore an above-mentioned current peak, preferably a current value correlating with the above-mentioned current peak and/or a pertaining time value.

As an alternative or in addition, the characterizing quantity may also be a starting time to be observed, within which the internal-combustion engine has to have started. When driving the internal-combustion engine, from this starting time, the electric power to be drawn by the electric machine from the first storage unit for this purpose and therefore the electric power required for the driving of the internal-combustion engine, or the electric current flowing through the electric machine will be determined and adjusted or limited. As an alternative or in addition, the characterizing quantity may also be a torque of the internal-combustion engine which, during the starting operation, has to be overcome by the electric machine. As a function of this torque, a value is determined for the electric power to be generated for this purpose by the electric machine and therefore for the current flowing through the electric machine during the starting operation.

Independently of which value is used as the basis for determining a value for the electric power to be drawn by the electric machine from the first storage unit for driving the internal-combustion engine or for the current in this case flowing through the electric machine, as a function of this value, values are determined for duty factors by which semiconductor elements present in the adjusting unit are to be triggered in order to adjust or limit the demanded electric power or the demanded electric current.

Preferably, the characterizing quantity is a value which is determined ahead of time within the scope of an application and is stored or filed in the adjusting unit. Advantageously, when adjusting the electric quantity or the drawn electric power itself, a value representing the charging position of the first storage unit can be taken into account, this value preferably being the voltage applied to the first storage unit.

In a further development of the invention, a bridging unit, which can be activated, is provided, during whose activation, the electric machine, while bypassing the adjusting unit, is connected directly with the first storage unit and a second storage unit. This measure has the following advantage. For example, in the case of a cold starting, during the starting operation, extremely high currents flow through the electric machine, particularly when this starting operation is carried out at a very low ambient temperature. If the circuitry-related arrangement is now maintained, according to which the electric machine is connected by way of the adjusting unit with the first storage unit, the limitation functionality of the adjusting unit may have the effect that the extremely high currents required for the starting of the internal-combustion engine cannot occur. When now, by activating the bridging unit, the circuitry-related arrangement is disintegrated such that the electric machine is connected directly with the first storage unit or a further second storage unit, preferably a lead accumulator arranged in a 12 V onboard power supply system, the extremely high currents can be implemented because the limitation functionality of the adjusting unit has no effect. A corresponding approach may also be required during the first start in certain situations.

As mentioned above, the electric machine has a number of stator windings. Advantageously, the adjusting unit has a number of series-connected first and second semiconductor elements for each of the stator windings, the series connection having a center tap, to which the respective stator winding is connected. If the electric machine has three stator windings, the adjusting unit will have six semiconductor elements in its minimal configuration. Should all three first and three second semiconductor elements be transistors, preferably MOSFET transistors, the adjusting unit will contain a so-called B6 bridge by way of which the three stator windings are supplied with current. For this purpose, the adjusting unit is designed for triggering the first and second transistors connected in series for a stator winding in a complementary fashion corresponding to a predefined trigger pattern. Advantageously, the adjusting unit contains at least two series connections, preferably four series connections, for each of the stating windings. The series connection is connected parallel to one another. As a result the demanded high electric currents can be implemented.

In a further development of the invention, at least one smoothing filter is provided. This smoothing filter is preferably contained in the adjusting unit and is, for example, implemented as an LC section. By using a smoothing filter, the adjusting unit corresponds to the circuit diagram of a classical step-down converter with respect to its periphery concerning the power part. The smoothing filter has the function of damping possibly occurring voltage peaks and thereby smoothing the voltage applied on the output side of the adjusting unit. As a result, external power losses and disturbances in the input-side voltage of the step-down converter can be avoided. Furthermore, the wear at the brushes of the pinion starter motor are reduced by the use of the smoothing filter.

In a further development of the invention, the adjusting unit is further designed for limiting an electric voltage applied to the electric machine. This measure has the following advantage. If a vehicle is equipped with a new drive architecture, it has a separate onboard power supply system whose voltage is higher than the voltage of a conventional onboard power supply system. Based on the voltage of the separate onboard power supply system, it now becomes possible to generate a voltage of 12V, which corresponds to the value of a conventional onboard power supply system. It thereby becomes possible to supply an electric machine, which is designed for a 12 V onboard power supply system, with electric energy by way of the separate onboard power supply system.

It is understood that the above-mentioned characteristics and the characteristics to be explained in the following can be used not only in the respectively indicated combination but also in other combinations or alone without leaving the scope of the present invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
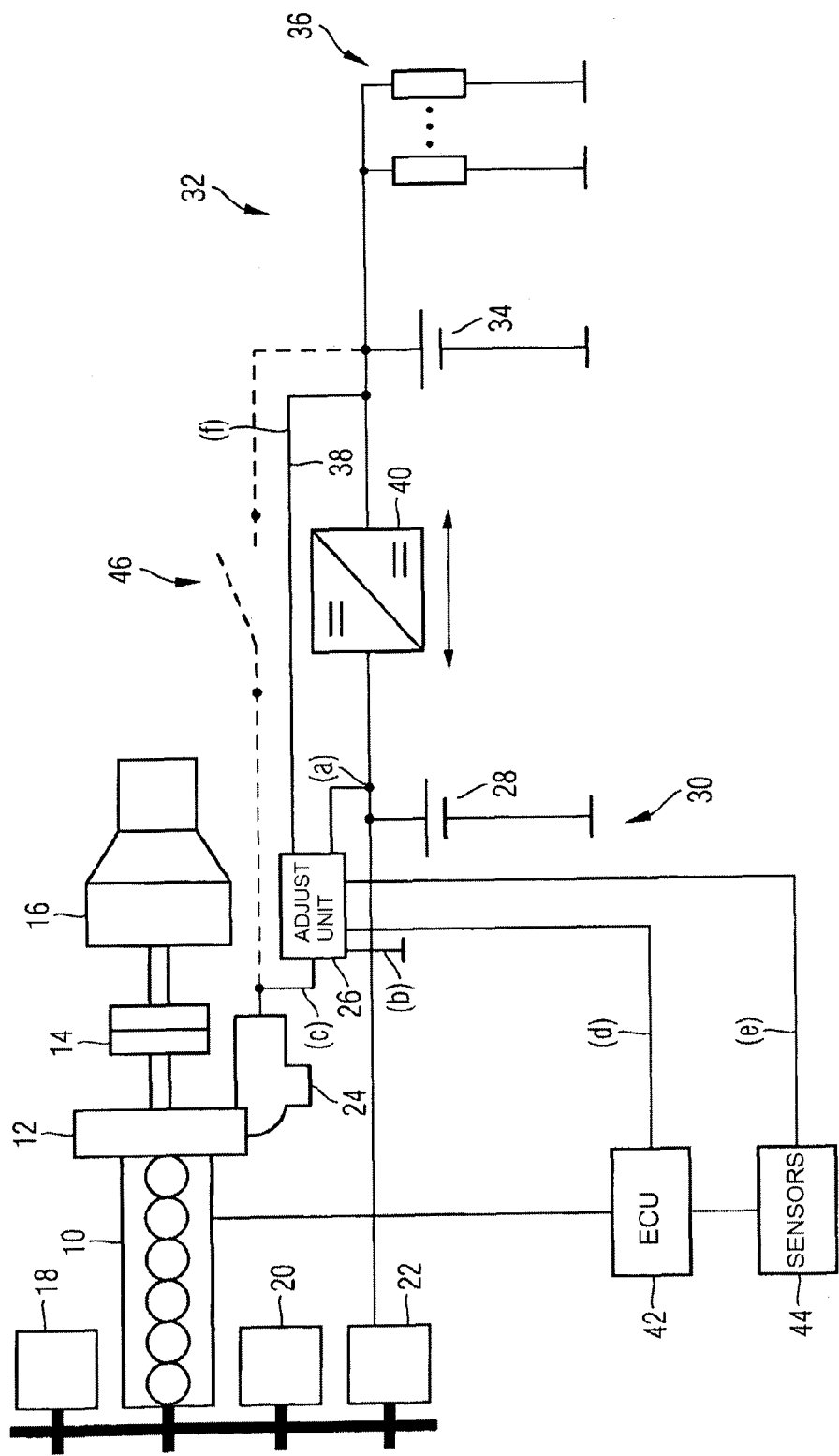
FIG. 1 is a schematic representation of a partially peripheral vehicle drive train for explaining the invention.

FIG. 1 illustrates an internal-combustion engine 10 arranged in a vehicle. This internal-combustion engine 10 is in an operative connection by way of a dual-mass flywheel 12 and a separating clutch 14 with a transmission 16 in order to drive driving wheels, which are not shown. Furthermore, various assemblies, such as a water pump 18, a cooling compressor 20 and an electric generator 22 are operatively connected with the internal-combustion engine 10 in order to be driven by it. With respect to the construction, this corresponds to a conventional vehicle. In the case of a hybrid vehicle, particularly a vehicle constructed as a parallel hybrid, a correspondingly designed electric machine is provided for the propulsion in addition to the internal-combustion engine 10.

For starting the internal-combustion engine 10, an electric machine 24 is provided, which can be connected by way of an adjusting unit 26 with a first storage unit 28. The first storage unit 28 is part of a first onboard power supply system 30, which is provided for supplying the electric machine 24. The first storage unit 28 may be a supercapacitor or a lithium-ion accumulator.

The vehicle has a second, conventional onboard power supply system 32, also called a basic onboard power supply system. The second onboard power supply system 32 has a second storage unit 34 which is constructed, for example, as a conventional lead battery. First consuming devices 36 are supplied with electric energy from the second storage unit 34. In addition, based on the second storage unit 34, a supply voltage required for operating the circuitry related to the adjusting unit 26 is provided by way of a first supply line 38. The electric generator 22 is used for charging the first storage unit 28 and the second storage unit 34, the second storage unit 34 being connected with the generator 22 by way of a correspondingly designed d.c. converter 40.

For activating the internal-combustion engine 10, an engine control unit 42 is provided, to which, originating from sensors 44, the values or data required for this purpose are supplied. In addition, the engine control unit 42 is connected with the adjusting unit 26, so that data or values required for its operation can be supplied to the adjusting unit 26. As an alternative or in addition, data or values can also be provided by the sensors 44 themselves.

The adjusting unit 26 is designed for detecting at least one defined internal-combustion engine operating state and/or at least one defined vehicle operating state. As a function of the detected states, an electric quantity will then be adjusted which determines an electric power drawn during the starting operation of the internal-combustion engine 10 by the electric machine 24 from the first storage unit 28. The current flowing through the electric machine 24 is preferably limited. As an alternative, the electric power itself drawn from the first storage unit 28 may be adjusted.

An activatable bridging unit 46 may optionally be provided, which is outlined in FIG. 1 by the broken line. In the arrangement of the bridging unit 46 illustrated in FIG. 1, its activation has the result that the electric machine 24 is not supplied by way of the path consisting of the first storage unit 28 and the adjusting unit 26 but from the second storage unit 34 with electric energy required for driving the internal-combustion engine 10. The activation of the bridging unit 46 may, for example, be necessary in the case of a first storage unit constructed as a lithium-ion accumulator, specifically when a cold start of the internal-combustion engine 10 is to take place at very low ambient temperatures. The reason is that, in the case of such accumulators, the internal resistance will increase at cold temperatures and the power that can be supplied by the accumulator will therefore decrease. The activation of the bridging unit 46 may also be required in the case of a first start. The second storage unit 34 is to provide a voltage of 12 V, whereas the first storage unit 28 is to supply a voltage in the order of from 20 to 50 V.

The schematic representation illustrated in FIG. 1 is to have no limiting effect on the architecture or topology of the onboard power supply system. The partial FIGS. 2a, 2b and 2c to be described below illustrate different onboard power supply architectures in which the adjusting unit 26 is used.

Figure 2A:
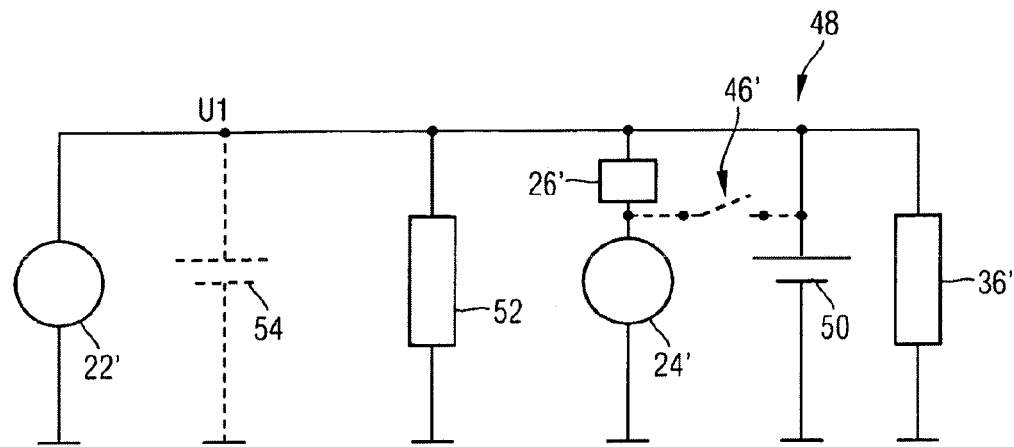
FIGS. 2a-2c are views of three partial figures of different onboard power supply system architectures in which the invention is used.

The partial FIG. 2a illustrates a conventional onboard power supply system 48 (standard power supply system) which, with respect to the functionality, corresponds to the second onboard power supply system illustrated in FIG. 1. The conventional onboard power supply system 48 has a storage unit 50 for providing a 12 V voltage U1, according to the invention this being the first storage unit. In addition, the conventional onboard power supply system 48 has first consuming devices 36' and second consuming devices 52. The storage unit 50 may be charged by way of a generator 22', which is a 12 V generator. An electric machine 24' is connected with the first storage unit 50 by way of an adjusting unit 26'. By means of a bridging unit 46', the electric machine 24' can be connected directly with the storage unit 50 in the case of a cold start to be carried out at low ambient temperatures and/or in the case of a first start. As a function of the electric current demanded and therefore to be adjusted, which is to flow through the electric machine 24' during the starting operation, the adjusting unit 26' will be triggered correspondingly. Optionally, during the triggering of the adjusting unit 26', the minimal onboard power supply system voltage can additionally be taken into account. As a result of the adjusting unit 26', by which the current flowing through the electric machine 24' can be limited, the use of an additional storage unit 54 will not be necessary, which would otherwise have to be provided for supplying the electric machine 24' in order to avoid voltage drops in the onboard power supply system voltage during the starting operation. The conventional onboard power supply system 48 can be used in the case of conventional vehicles (without an automatic start-stop system).

Figure 2B:
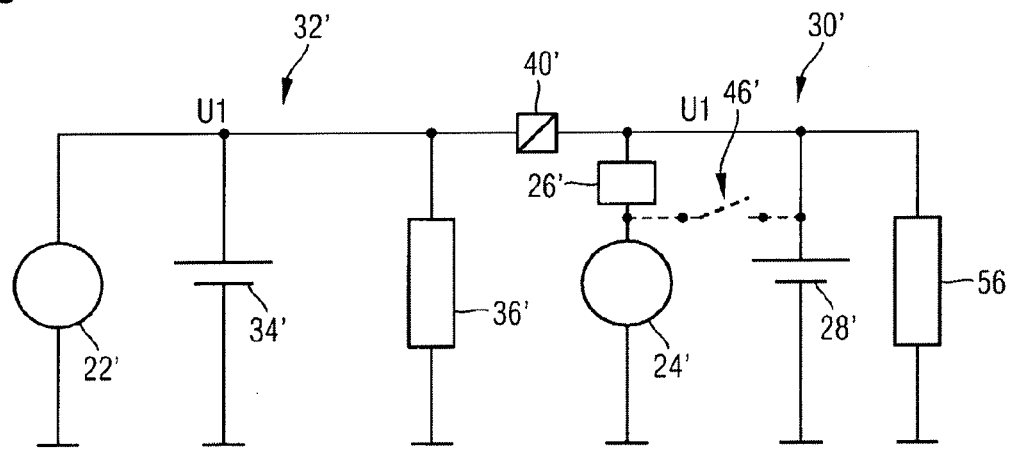

The partial FIG. 2b illustrates a second, conventional onboard power supply system 32' (basic onboard power supply system) which is connected by way of a d.c. voltage converter 40' with a first onboard power supply system 30', a so-called separate additional-start onboard power supply system. The two onboard power supply systems are separated by the d.c. voltage converter 40'. Such an expanded onboard power supply system architecture is used, for example, in a vehicle having an automatic start-stop system, where an additional starting or restarting of the internal-combustion engine is to be carried out. This onboard power supply system architecture can also be used in the case of a hybrid vehicle, where a restarting of the internal-combustion engine is to be carried out. The first onboard power supply system 30' has a first storage unit 28' for providing a 12 V voltage U1 and third consuming devices 56. An electric machine 24' is connected with the first storage unit 28' by way of an adjusting unit 26'. Also in this case, a bridging unit 46' is provided by which, corresponding to the statements made concerning partial FIG. 2a, the electric machine 24' can be connected directly with the first storage unit 28'. The second onboard power supply system 32' has a generator 22', a second storage unit 34' and first consuming devices 36'. As a function of the electric current demanded and therefore to be adjusted, the adjusting unit 26' is triggered correspondingly, so that this current flows and a predefined rotational-speed course occurs for the internal-combustion engine. Optionally, during the triggering of the adjusting unit 26', the minimal onboard power supply system voltage can additionally be taken into account. Further statements concerning the adjusting unit 26' are contained in the description of partial FIG. 2a. The first storage unit 28' and the second storage unit 34' can be charged by way of the generator 22'.

Figure 2C:
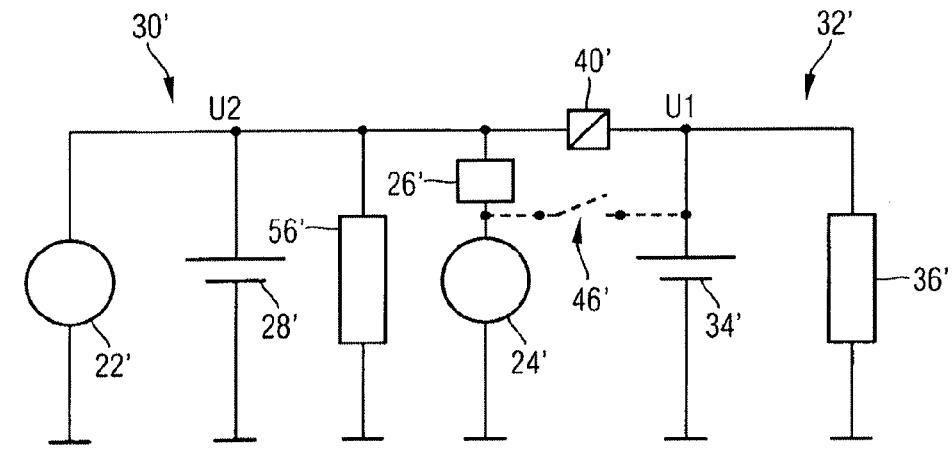

The onboard power supply system architecture illustrated in FIG. 2c corresponds to the onboard power supply architecture illustrated in FIG. 1. A second conventional onboard power supply system 32' is coupled by way of a d.c. voltage converter 40' with a first onboard power supply system 30'. The first onboard power supply system 30' is a so-called additional-start onboard power supply system. The second onboard power supply system 32' has a second storage unit 34' and first consuming devices 36'. An electric machine 24' is connected by way of an adjusting unit 26' with a first storage unit 28' contained in the first onboard power supply system 30'. The first onboard power supply system 30' further has a generator 22' and third consuming devices 56'. By means of a bridging unit 46', the electric machine 24' can be connected directly with the second storage unit 34'. The second storage unit 34' is preferably constructed as a lead accumulator. In the case of a cold start to be carried out at low ambient temperatures and/or in the case of a first start, the electric machine 24' can therefore be supplied with electric energy from the second storage unit 34' while bypassing the adjusting unit 26'. The onboard power supply system architecture illustrated in partial FIG. 2c can be used, for example, in the case of a vehicle constructed as a mild-hybrid vehicle. The use of the adjusting unit 26' makes it possible to be able to supply the electric machine 24' also by way of the first storage unit 28' whose voltage is clearly higher, preferably between 20 V and 60 V, than the 12 V onboard power supply voltage provided in the second onboard power supply system 32'. By means of this onboard power supply system architecture, it becomes possible to operate an electric machine which is designed for a 12 V supply voltage—a so-called 12 V starter—by use of a supply voltage which is higher than 12V.

At this point, the following should be noted. In FIGS. 1 and 2, the bridging unit 46 and 46' respectively is in each case illustrated by a broken line. This is to indicate that it is not absolutely necessary to provide a bridging unit. If the used components, particularly the storage units 28 and 28' respectively, are designed correspondingly, the use of a bridging unit would not be necessary.

Figure 3:
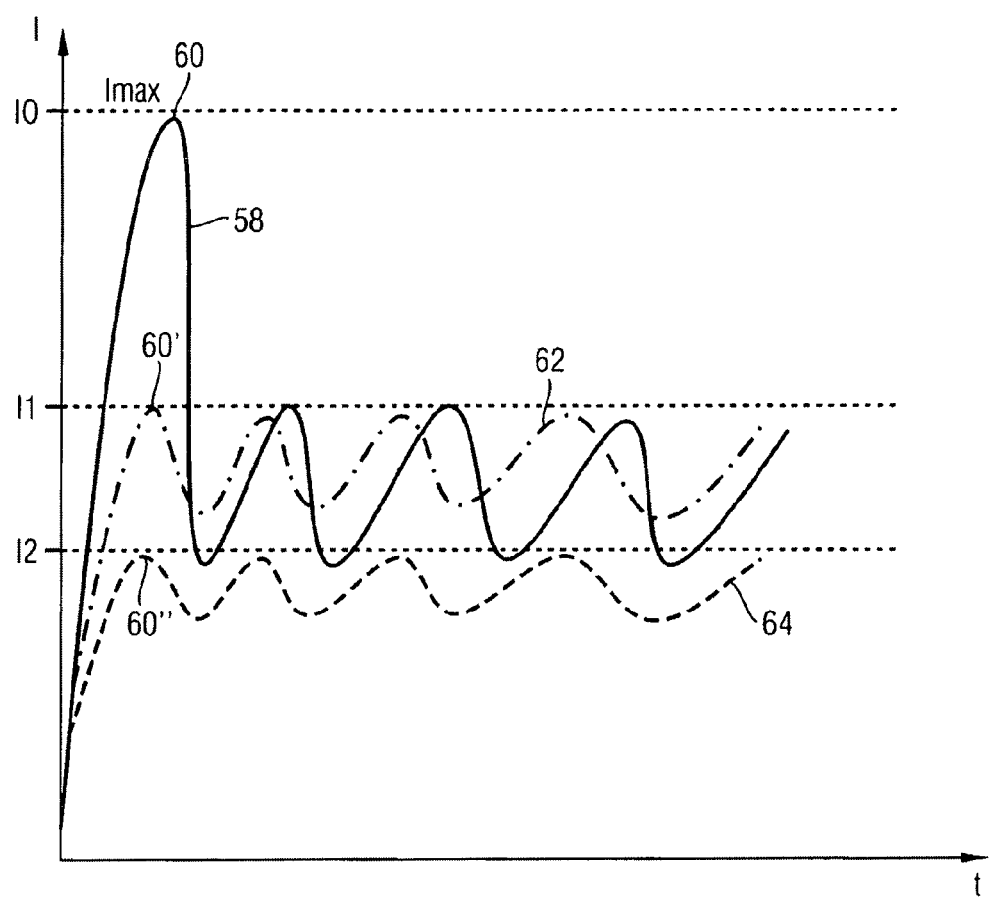
FIG. 3 is a view of the flow curves of different currents flowing through the electric machine during a starting operation.

FIG. 3 illustrates curves of the flow courses of different currents which flow through the electric machine during a starting operation. The first curve of the flow course marked 58 shows a flow course as it occurs in the case of an onboard power supply system that is not equipped with the adjusting unit according to the invention. After an initial peak 60, at which the maximal short-circuit flow Imax is reached, an essentially periodic current occurs which alternates corresponding to the compression in the cylinders of the internal-combustion engine. In contrast, the second and third curves of the flow courses marked 62 and 64 show their courses in the case of an onboard power supply system that is equipped with the adjusting unit according to the invention. The use of the adjusting unit permits the adjusting of different parameterizable electric currents which flow through the electric machine. In the present case, the flow course curve 62 represents a current as it occurs in the case of a cold start. In contrast, the flow course curve 64 represents a current, as it occurs in the case of a warm start. As illustrated by a comparison of the second flow course curve 62 and the third flow course curve 64, on the one hand, with the first flow course curve 58, on the other hand, the initial peaks 60 and 60" are reduced by the use of the adjusting unit according to the invention. As a result, drops in the onboard power supply voltage are avoided and simultaneously the useful life of the electric machine or of the starter motor is increased. The brushes of the electric machine become less worn, or their wear is reduced to a minimum. As a result of the fact that drops in the onboard power supply voltage are avoided or reduced, additional consuming devices, such as chassis systems, can be integrated in the additional-start onboard power supply system. In addition, measures for stabilizing the onboard power supply voltage can be eliminated. In this case, as a function of the demanded electric power which is to be provided to the electric machine for the starting of the internal-combustion engine, the adjusting unit is designed for actively adjusting or controlling a current that is ideal for this purpose and flows through the electric machine. Subsequent to the respective initial peak 60' or 60", this ideal current has an alternating course, corresponding to the compression of the internal-combustion engine. When determining the ideal current, different demands can be taken into account which are made on the rotational-speed course of the electric machine during the starting operation of the internal-combustion engine. Examples are a warm start, a cold start, a so-called reflex start or a start of the internal-combustion engine in different charging states of the first storage unit.

Figure 4:
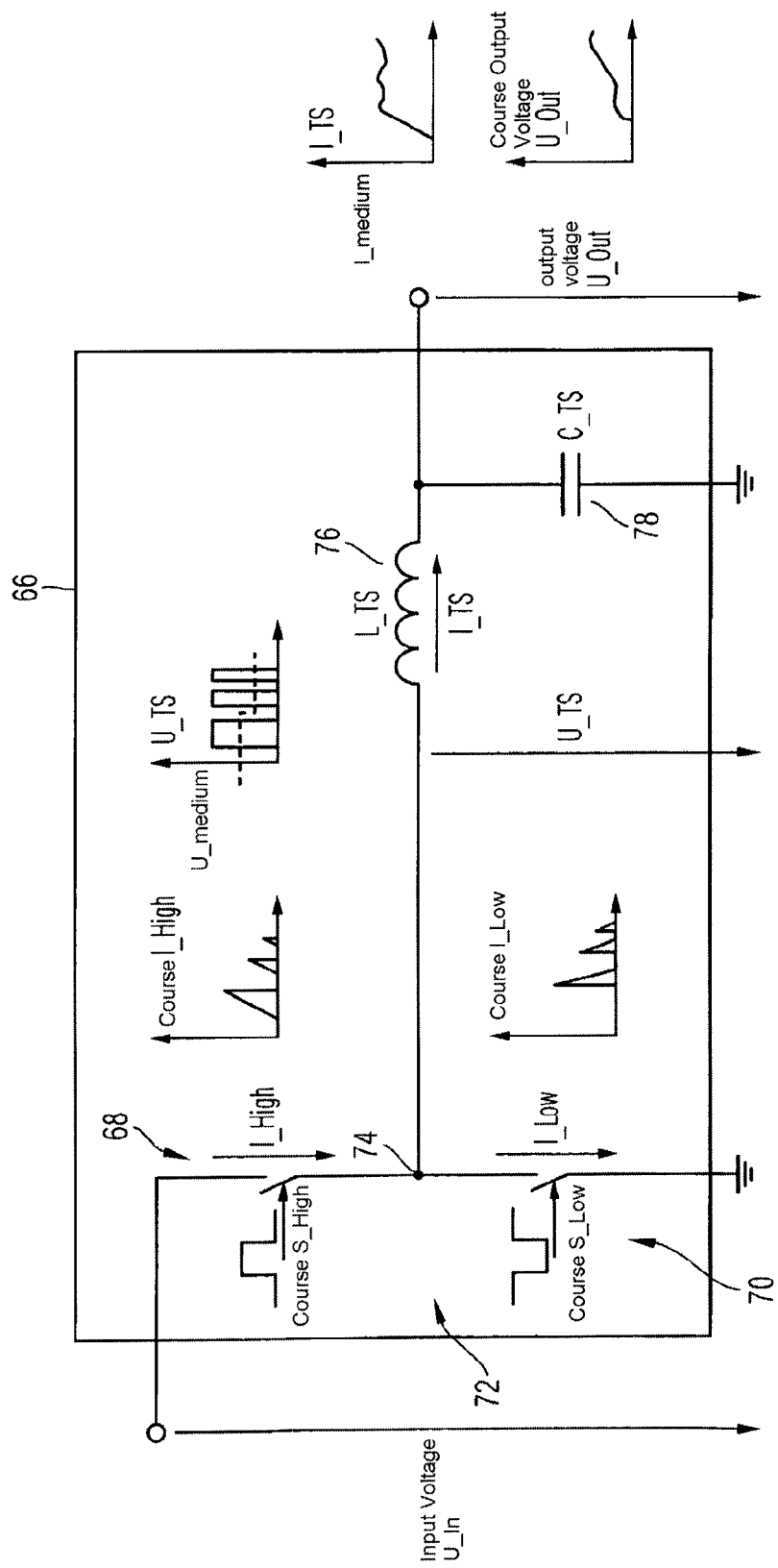
FIG. 4 is a view of a circuit diagram of a classical step-down converter.

FIG. 4 illustrates a circuit diagram of a classical step-down converter 66, by way of which an input voltage U_In is converted to an output voltage U_Out, the amount of the output voltage being smaller than the amount of the input voltage. The step-down converter has a first switching element 68 and a second switching element 70, which are connected in series. This series connection 72 has a center tap 74. A storage inductance 76 and a smoothing capacitor 78 are connected to the center tap 74. As illustrated by the courses S_High and S_Low, on the one hand, and I_High and I_Low, on the other hand, the two switching elements 68 and 70 are triggered or timed in a complementary manner. It was found to be advantageous to operate the step-down converter at a clock frequency in the order of approximately 25 kHz. The two switching elements 68 and 70 are preferably constructed as transistors, particularly as MOSFET transistors.

The representation in FIG. 4, according to which the step-down converter has a smoothing capacitor 78, should have no limiting effect. The smoothing capacitor may not be necessary, specifically when no very high demands are made on the ripple of the output voltage. Furthermore, the representation of two switching elements should have no limiting effect. It is also contemplated to replace the second switching element 70 by a recovery diode. At this point, it should be mentioned that voltage U_In, the output voltage U_Out and the voltage U_TS all have ground reference.

Figure 5:
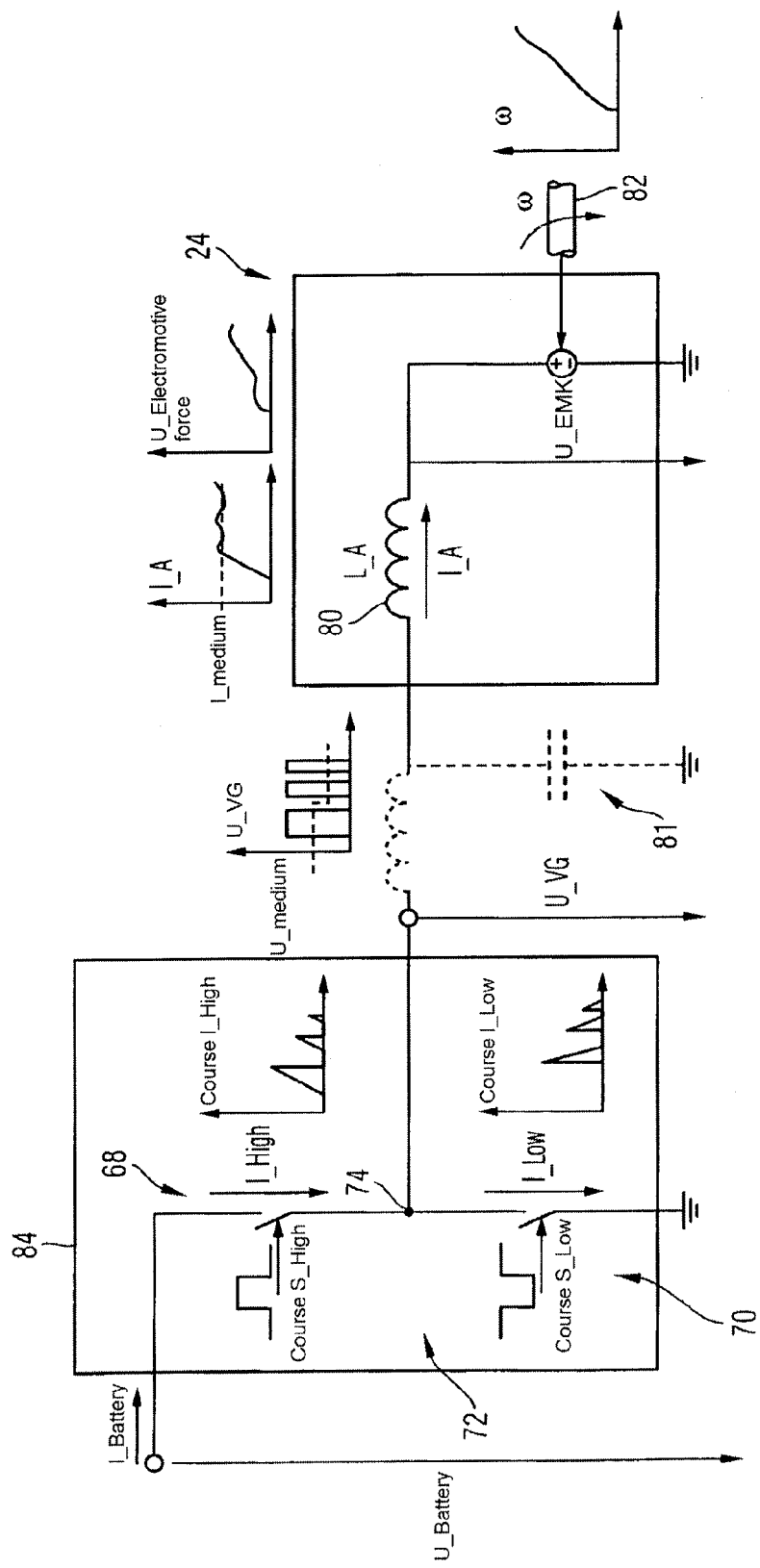
FIG. 5 is a view of a circuit diagram of a circuit used in the adjusting unit for the implementation of a step-down converter functionality.

FIG. 5 shows a circuit diagram used in the adjusting unit. The electric machine 24, more precisely, the starter motor, has a number of stator windings. It preferably is an electric machine with three stator windings, of which one stator winding is illustrated in FIG. 4 and is marked by reference number 80. The voltage U_EMK indicated in FIG. 5 represents the electric-motor force relative to the stator winding 80, which is generated as a result of the rotating motion of the shaft 82 of the electric machine.

The circuitry 84 of the adjusting unit illustrated in FIG. 5 is that circuit of the power part of the adjusting unit which provides the current flowing through the stator winding 80 and is connected for this purpose with the stator winding 80. The adjusting unit is designed for adjusting or limiting the electric current for the individual stator windings of the electric machine. The circuitry 84 has a first switching element 68 and a second switching element 70, which form a series connection 72 with a center tap 74. The stator winding 80 is connected to the center tap 74. The circuitry 84 illustrated in FIG. 5 is designed for the implementation of a step-down converter. The stator winding 80 is used as the storage inductance required for the implementation of the step-down converter functionality. This correspondingly applies to the remaining stator windings of the electric machine.

The circuit resulting from the linking of the two switching elements 68, 70 and the stator winding 80 is a modified step-down converter. As outlined in FIG. 5 by the broken-line representation, optionally, a smoothing filter 81 may be provided, specifically when the output voltage U_VG has to be smoothed in order to avoid excessive wear of the brushes of the electric machine 24. As a result of the use of the smoothing filter 81, a classical step-down converter is obtained, which consists of the following components: first switching element 68, second switching element 70, as well as the coil and the capacitor which are part of the smoothing filter 81. Irrespective of whether it is a classical step-down converter (with a smoothing filter 81) or a modified step-down converter (without a smoothing filter), the voltage provided by a first storage unit 28, 28' or 50 is converted downward. The voltage U_VG represents the voltage provided by the circuitry 84 of the adjusting unit.

Figure 6:
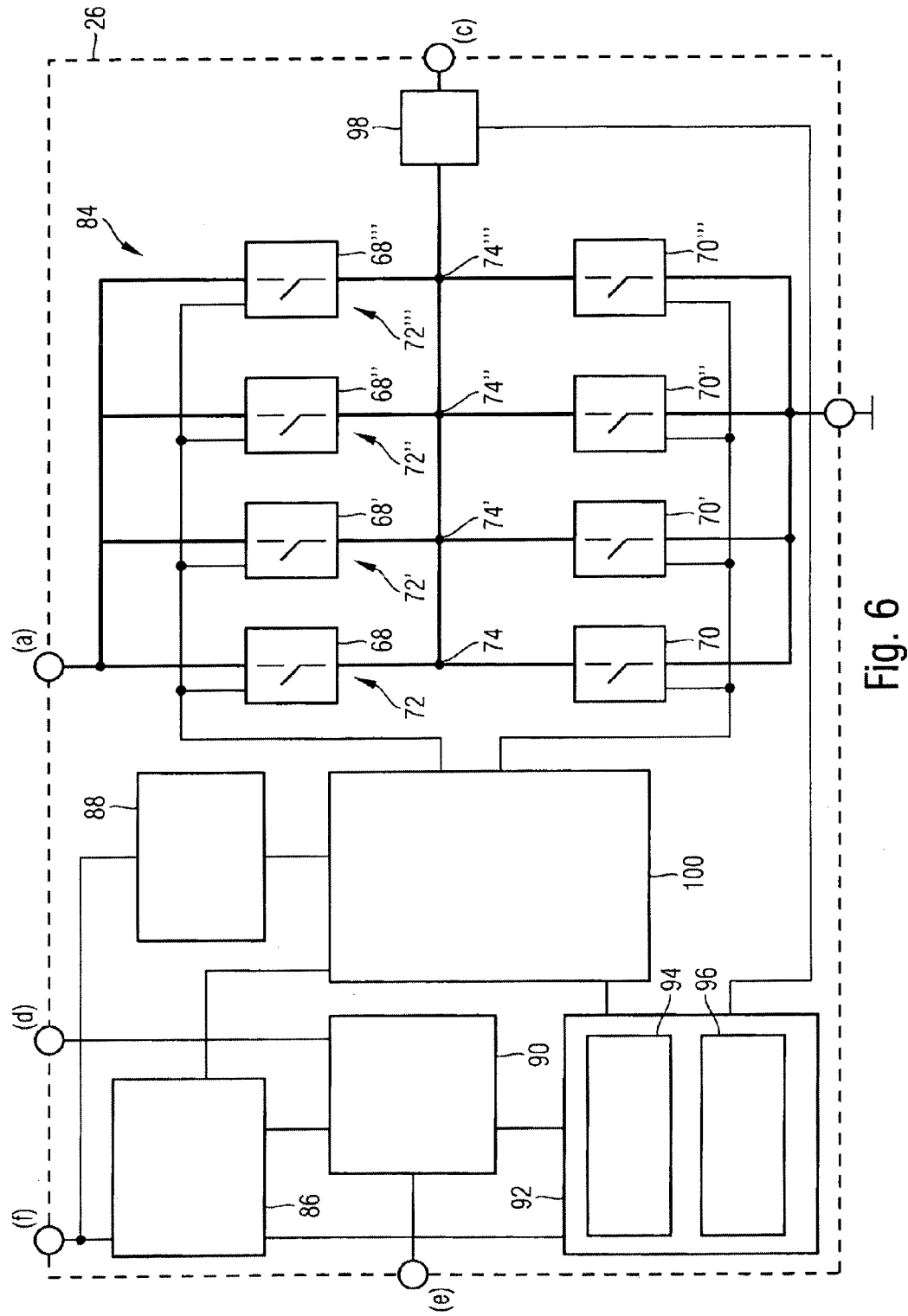
FIG. 6 is a schematic representation of the construction of the adjusting unit.

FIG. 6 illustrates the construction of the adjusting unit 26. In FIG. 6, the terminals are identified by lower case letters in parentheses. The lines illustrated in FIG. 1, which each correspond to the terminals, are identified by the corresponding lower case letters. As far as the circuitry 84 of the adjusting unit concerning the power part illustrated in FIG. 6 is concerned, it is shown for one stator winding of the electric machine.

The adjusting unit 26 has a first voltage supply unit 86, by which a first supply voltage is provided whose value amounts to 5 V. Furthermore, the adjusting unit 26 has a second voltage supply unit 88 for providing a second supply voltage which is between 10 V and 13V. Reference number 90 indicates a bus unit by which data supplied by way of terminals (d) and (e) are supplied to a control unit 92. If necessary, these data are previously processed in the bus unit 90. Furthermore, a current value is supplied to the control unit 92, which current value is detected by way of a current sensor 98. The current value represents the electric current that flows through the stator winding which is connected to the terminal (c). By taking into account the current value, the electric current flowing through the stator winding can be controlled to a predefined desired value. As an alternative to the output-side arrangement illustrated in FIG. 6, the current sensor 98 may also be arranged on the input side. However, in this case, a converting of the detected current value is required.

The control unit 92 has an detection unit 94 and an analysis unit 96. By use of the detection unit 94, at least one defined internal-combustion engine operating state and/or at least one defined vehicle operating state is detected. The triggering unit 96 is designed for adjusting, as a function of the detected internal-combustion operating state and/or of the detected vehicle operating state, an electric power itself drawn during the starting of the internal-combustion engine 10 by the electric machine 24 from the first storage unit 28, 28' or 50, or a value determining the electric power.

As a function of the internal-combustion engine operating state and/or of the vehicle operating state, an adaptation becomes possible of the electric power drawn by the electric machine from the first storage unit or of a value determining this power, more precisely, of the electric current flowing through the respective stator winding, at least to the different realities in the case of a cold start and warm start as well as to the different realities of the respective new operating strategy. Whether a warm start or a cold start is to be carried out can be determined by way of the temperature of the internal-combustion engine. A value representing the temperature of the internal-combustion engine is supplied by way of the terminal (d). Whether a restart or an additional start is to be carried out as recognized as follows. A restart is to be carried out when in an idle state of the vehicle a start-driving signal is present (in the idle state, the vehicle being stationary and the internal-combustion engine being stopped or having a rotational engine speed between a rotational parking speed and the zero value). An additional start is to be carried out when, in a vehicle moving state, an engine torque demand is present (the vehicle being driven in the vehicle moving state and the internal-combustion engine having stopped or having an engine rotational speed between a parking rotational speed and the zero value). As a result, the following values, signals and/or data are supplied by way of the terminal (d): a value representing the rotational engine speed, a value representing the vehicle speed, a start-driving signal and an engine torque demand. The values, signals and/or data supplied by way of the terminal (d) originate from the engine control unit 42. For example, with a view to the value representing the vehicle speed, the following approach is also contemplated. Instead of supplying this value by way of the terminal (d) and therefore originating from the engine control unit 42, a corresponding value detected by use of a corresponding sensor can also be supplied by way of the terminal (e). As an alternative, it is further contemplated to supply values determined by use or rotational wheel speed sensors and representing the respective rotational wheel speeds by way of the terminal (e), the determination of the value representing the vehicle speed then taking place in the control unit 92. A further value that is supplied by way of the terminal (e) is a value representing the charging state of the first storage unit.

In addition to the supplied values, signals and/or data, a characterizing quantity is taken into account in the control unit 92 for the determination of the electric power and of the electric current. This is a value which characterizes the starting behavior of the internal-combustion engine. The characterizing quantity may be a current value correlating with the initially mentioned current peak and/or a pertaining time value. As an alternative or in addition, it may be a starting time to be observed within which the internal-combustion engine has to have started. It may also be a torque of the internal-combustion engine which has to be overcome by the electric machine during the starting operation. In addition to the characterizing quantity, further values and/or data may also be filed in the adjusting unit, which have to be taken into account during the determination of the electric power or of the electric current. This may be the number of cylinders of the internal-combustion engine, information concerning the type of ignition initiation, information concerning the drive architecture and/or information concerning the further development of the storage unit.

Irrespective of which of the above-indicated values is finally used as the basis for determining a value for the electric power to be drawn by the electric machine from the first storage unit for driving the internal-combustion engine or for the current flowing through the electric machine during the process, as a function of this quantity, values are determined for duty factors by which first switching elements 68 and second switching elements 70 are triggered. The first as well as the second switching elements 68, 70 are each constructed as semiconductor elements. In the analysis unit 96, values representing the duty factors are determined, which are then supplied to a driver unit 100. In the driver unit 100, the driver signals are then determined for triggering the first and second switching elements 68, 70.

As illustrated in the representation of FIG. 6, several series connections 72, 72', 72" and 72"' are connected parallel in order to be able to implement the required current intensity for the electric current flowing through the respective stator winding during the starting operation.

In a first embodiment, the adjusting unit 28 is to contain one model respectively of the voltage supply units 86 and 88 as well as of units 90, 92 and 100. The units 90, 92 and 100 therefore form the circuitry-related periphery of the adjusting unit 26. In the case of this embodiment, by means of the units 90, 92 and 100, the electric currents which in each case flow through all of the stator windings of the electric machine are determined for all stator windings. In an alternative embodiment, the adjusting unit 26 is to have one individually assigned model of the units 90, 92 and 100 for each of the stator windings.

By means of FIG. 7, the control concept will be described in the following on which the adjusting unit 26 is based and which is stored in the control unit 92, preferably in the analysis unit 96. This is a current control by which a control deviation $I_{ERROR}$ is determined based on a desired value $I_{DESIRED}$ for the electric current which, during the starting operation, is to flow through the respective stator winding of the electric machine, and an actual value $I_{ACTUAL}$ for this current which is recorded by means of the current sensor 98 (not shown in FIG. 7). The control deviation $I_{ERROR}$ is converted by means of a first PI controller 102 to a control voltage $U_{CTRL}$. By using a sawtooth signal $U_{SAWTOOTH}$, which is determined by means of a sawtooth generator 104, the control voltage $U_{CTRL}$ is converted to values representing duty factors. In a first determination unit 106, first values are determined which represent the duty factors for the first switching elements 68. In a second determination unit 108, second values are determined which represent the duty factors for the second switching elements 70. In this case, the first and second values are determined such that the first and second switching elements 68 and 70 are triggered inversely. The first and second values are supplied to the driver unit 100 in which then driver signals are determined for triggering the first and second switching elements or semiconductor elements 68, 70.

In a supplementary fashion, a desired-value reduction can be carried out for the desired value $I_{DESIRED}$, which is outlined by a desired-value reduction unit 110 shown by a broken line. With the desired-value reduction, when determining the control deviation $I_{ERROR}$ and therefore finally when determining the duty factors to be adjusted, the charging state of the first storage unit is also taken into account. In the case of the desired-value reduction, a deviation value is determined which represents a voltage deviation that is present between an actual voltage value $U_{ACTUAL}$ and a maximal voltage value $U_{MAX}$. The actual voltage value $U_{ACTUAL}$ is determined, for example, by use of a shunt resistor which is not shown in FIG. 7. The maximal voltage value $U_{MAX}$ represents the onboard power supply system voltage which corresponds to the voltage provided by the first storage unit 28. The thus determined voltage deviation is first limited in a limitation unit 112 and is subsequently converted to a current correction value in a second PI controller 114.

Figure 7:
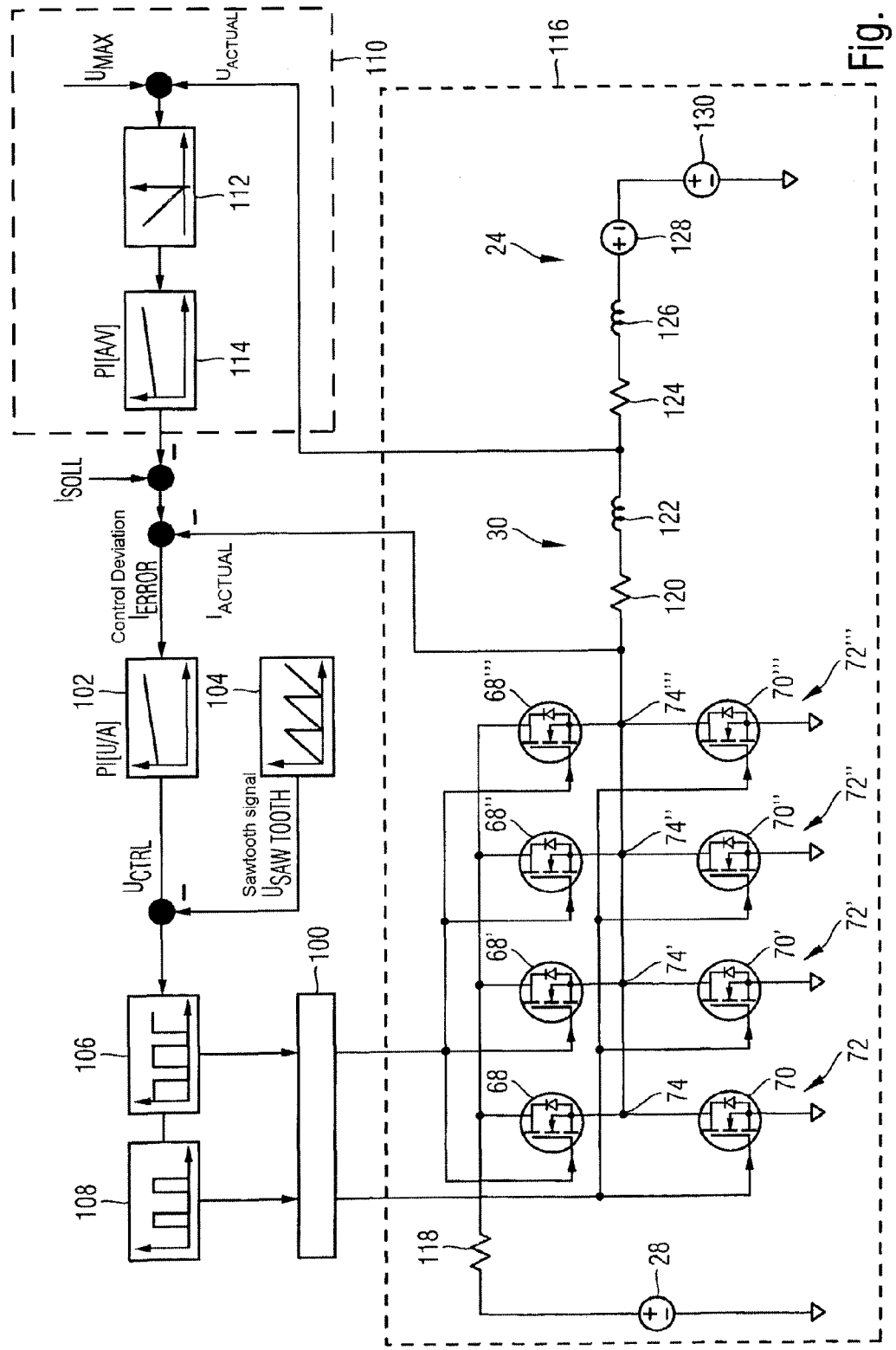
FIG. 7 is a schematic representation of the control concept on which the adjusting unit is based.

In FIG. 7, the first and second switching elements 68, 70 are illustrated as part of a controlled system 116. FIG. 7 shows further components pertaining to the controlled system 116. These components reflect the realities of the first storage unit 28, of the first onboard power supply system 30 and of the electric machine 24, which is why there are no discretely constructed components. Specifically, these are the following components. The internal resistance 118 of the first storage unit 28; the line resistance 120 of the first onboard power supply system 30; the line inductance 122 of the first onboard power supply system 30; the winding resistance 124 of a stator winding of the electric machine 24; the winding inductance 126 of the stator winding of the electric machine 24; a voltage source representing the brush transition voltage; and a voltage source 130 representing the voltage applied to the stator winding. For reasons of clarity, a smoothing filter was not shown in FIG. 7. The smoothing filter would have to be inserted between the center tap 74"' and the line resistance 120.

The adjusting unit is preferably designed such that a restarting and/or additional starting of an internal-combustion engine can take place by way of a first onboard power supply system whose onboard power supply voltage is in the range of between 20 V and 50 V, in which case, during the starting operation, an electric current limited to 500 A should be able to flow through the individual stator windings for the duration of approximately 0.5 s.

The use of the adjusting unit according to the invention has the following advantages.

(1) By means of a single starting system, consisting of a starter motor and an onboard power supply system, ideal and fast starting times, within which the internal-combustion engine is to be started, can always be implemented at different operating temperatures of the internal-combustion engine (cold start, warm start).

(2) A uniform starter motor can be used for different operating strategies (restart and/or additional start), different concepts of the ignition initiation, internal-combustion engines of a different number of cylinders, different drive architectures (for example, micro- or mild-hybrid vehicles), very different energy storage devices (such as supercapacitors), or different starting scenarios depending on the operating temperature of the internal-combustion engine.

(3) By means of the active current limitation, the oxidation of the carbon brushes of the starter motor is reduced, thereby increasing its useful life.

Significant low voltages during the starting operation can be avoided in an additional-start onboard power supply system or a starter onboard power supply system. As a result, it becomes possible, on the one hand, to integrate additional consuming devices into the additional-start onboard power supply system. On the other hand, additional direct-voltage converters stabilizing the onboard power supply system, or additional storage devices in the additional-start onboard power supply system will not be necessary.

It is to be understood that when it was stated above that an electric current flows through the electric machine, it means that the current flows through at least one of the stator windings of the electric machine.

LIST OF REFERENCE NUMBERS

10 Internal-combustion engine
12 Dual-mass flywheel
14 Separating clutch
16 Transmission
18 Water pump 20 Cooling compressor
22 Electric generator
24 Electric machine
26 Adjusting unit
28 First storage unit
30 First onboard power supply system
32 Second onboard power supply system
34 Second storage unit
36 First consuming devices
38 First supply line
40 Direct-current converter
42 Engine control unit
44 Sensors
46 Activatable bridging unit
48 Conventional onboard power supply system
50 Storage unit
52 Second consuming devices
54 Additional storage unit
56 Third consuming devices
58 First current flow curve
60 Initial peak
62 Second current flow curve
64 Third current flow curve
66 Classical step-down converter
68 First switching element
70 Second switching element
72 Series connection
74 Center tap
76 Storage inductance
78 Smoothing capacitor
80 Stator winding
81 Smoothing filter
82 Shaft
84 Partial periphery-adjusting unit
86 First voltage supply unit
88 Second voltage supply unit
90 Bus unit
92 Control unit
94 Detection unit
96 Analysis unit
98 Current sensor
100 Driver unit
102 First PI controller
104 Sawtooth generator
106 First determination unit
108 Second determination unit
110 Desired-value reduction unit
112 Limitation unit
114 Second PI controller
116 Controlled system
118 Internal resistance
120 Line resistance
122 Line inductance
124 Winding resistance
126 Winding inductance
128 Voltage source
130 Voltage source The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for starting an internal-combustion engine arranged in a vehicle, comprising:
an electric machine configured for at least temporarily driving the internal-combustion engine;
a first storage unit configured for storing electric energy;
an adjusting unit by which the electric machine is connectable with the first storage unit, wherein:
the adjusting unit being configured to detect at least one defined internal-combustion engine operating state and/or at least one defined vehicle operating state,
the adjusting unit being configured to adjust one of: (i) an electric quantity which determines an electric power draw from the first storage unit by the electric machine when driving the internal-combustion engine, or (ii) the drawn electric power itself, in dependency of the detected defined internal-combustion engine operating state, the detected defined vehicle operating state, and/or a function of a value characterizing the internal-combustion engine, wherein the value characterizing the internal-combustion engine includes a value characterizing a starting behavior of the internal-combustion engine, or a starting time within which the internal-combustion engine has to be started, or a torque of the internal-combustion engine which, during the starting, has to be overcome by the electric machine; and
an activatable bridging unit configured to connect directly the electric machine with the first storage unit or a second storage unit, while bypassing the adjusting unit, when activated during a cold start.

2. The system according to claim 1, wherein the adjusting unit is configured for limiting an electric current drawn by the electric machine from the first storage unit.

3. The system according to claim 2, wherein:
the electric machine comprises a number of stator windings,
the adjusting unit is configured for limiting the electric current for individual stator windings.

4. The system according to claim 1, wherein the adjusting unit is configured to provide a step-down converter functionality.

5. The system according to claim 2, wherein the adjusting unit is configured to provide a step-down converter functionality.

6. The system according to claim 3, wherein the adjusting unit is configured to provide a step-down converter functionality.

7. The system according to claim 4, wherein the electric machine comprises a number of stator windings, at least one of the stator windings being used as a storage inductance required to provide the step-down converter functionality.

8. The system according to claim 1, wherein the electric machine comprises a number of stator windings, the adjusting unit comprising a number of series-connected first and second semiconductor elements for each of the stator windings, each series connection having a center tap to which the respective stator winding is connected.

9. The system according to claim 1, further comprising at least one smoothing filter.

10. The system according to claim 1, wherein the adjusting unit is configured to limit an electric voltage applied to the electric machine.

11. A method for starting an internal-combustion engine arranged in a vehicle equipped with an electric machine configured for at least temporarily driving the internal-combustion engine, a first storage unit configured for storing electric energy, an adjusting unit by which the electric machine is connectable with the first storage unit, and an activatable bridging unit, the method comprising the acts of:

detecting, by the adjusting unit, at least one defined internal-combustion engine operating state and/or at least one defined vehicle operating state;

adjusting, by the adjusting unit, one of: (i) an electric quantity that determines an electric power drawn by the electric machine from the first storage unit when driving the internal-combustion engine, or (ii) the drawn electric power itself, in dependency of the detected defined internal-combustion engine operating state, the detected defined vehicle operating state, and/or a function of a value characterizing the internal-combustion engine, wherein the value characterizing the internal-combustion engine includes a value characterizing a starting behavior of the internal-combustion engine, or a starting time within which the internal-combustion engine has to be started, or a torque of the internal-combustion engine which, during the starting, has to be overcome by the electric machine; and connecting directly, by the activatable bridging unit, the electric machine with the first storage unit or a second storage unit, while bypassing the adjusting unit, when activated during a cold start.

12. A computer readable medium storing executable instructions, the executable instructions when executed by a system for starting an internal-combustion engine arranged in a vehicle equipped with an electric machine for at least temporarily driving the internal-combustion engine, a first storage unit for storing electric energy, an adjusting unit by which the electric machine is connectable with the first storage unit, and an activatable bridging unit, causes the system to:

detect, by the adjusting unit, at least one defined internal-combustion engine operating state and/or at least one defined vehicle operating state;

adjust, by the adjusting unit, one of: (i) an electric quantity that determines an electric power drawn by the electric machine from the first storage unit when driving the internal-combustion engine, or (ii) the drawn electric power itself, in dependency of the detected defined internal-combustion engine operating state, the detected defined vehicle operating state, and/or a function of a value characterizing the internal-combustion engine, wherein the value characterizing the internal-combustion engine includes a value characterizing a starting behavior of the internal-combustion engine, or a starting time within which the internal-combustion engine has to be started, or a torque of the internal-combustion engine which, during the starting, has to be overcome by the electric machine; and connect directly, by the activatable bridging unit, the electric machine with the first storage unit or a second storage unit, while bypassing the adjusting unit, when activated during a cold start.

* * * * *